(12) United States Patent
Haas et al.

(10) Patent No.: US 6,413,354 B1
(45) Date of Patent: Jul. 2, 2002

(54) OIL RESISTANT SILICONES

(75) Inventors: Hans E. Haas, Stow, OH (US); Frank L. Kovacs, Meridan, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/485,952

(22) Filed: Feb. 17, 2000

Related U.S. Application Data

(60) Provisional application No. 60/089,549, filed on Jun. 17, 1998.

(51) Int. Cl.$^7$ .............................................. C09J 183/06
(52) U.S. Cl. ...................... 156/329; 525/479; 525/477; 528/17; 528/39; 528/901; 556/482; 524/588; 524/127; 524/123; 524/323; 524/366; 524/493; 524/497; 524/448; 427/387; 277/591
(58) Field of Search ................................. 525/479, 477; 528/17, 39, 901; 556/482; 524/588, 127, 123, 323, 366, 493, 497, 448; 156/329; 277/591; 427/387

(56) References Cited

U.S. PATENT DOCUMENTS

| | | | |
|---|---|---|---|
| 4,514,529 A | 4/1985 | Beers et al. | 523/200 |
| 4,673,750 A | 6/1987 | Beers et al. | 549/215 |
| 4,735,979 A | 4/1988 | Beers et al. | 524/188 |
| 4,847,396 A | 7/1989 | Beer et al. | 556/421 |
| 5,534,588 A | * 7/1996 | Knepper et al. | |

FOREIGN PATENT DOCUMENTS

| | | | |
|---|---|---|---|
| EP | 220809 A2 | * 5/1987 | |
| GB | 1581727 | * 12/1980 | |
| WO | WO 93/19130 | 3/1993 | C08L/83/04 |

* cited by examiner

*Primary Examiner*—Robert Dawson
*Assistant Examiner*—Kuo-Liang Peng
(74) *Attorney, Agent, or Firm*—Steven C. Bauman

(57) ABSTRACT

A silicone composition that is oil resistant when cured is described. More particularly, this composition includes a silanol terminated silicone fluid, an organic plasticizer, a filler and a crosslinker, wherein the cured composition remains adhesive after exposure to oil. The present compositions provide superior adhesive properties after exposure to oil than conventional RTV silicone adhesives having M-stopped silicone plasticizers. Methods of making and using cured elastomeric products made from the present compositions are also provided.

29 Claims, No Drawings

OIL RESISTANT SILICONES

This application claims benefit of provisional application Ser. No. 60/089,549 filed Jun. 17, 1998.

BACKGROUND OF THE INVENTION

1. Field of the Invention

The present invention relates generally to oil resistant silicone compositions. More particularly, the present invention relates to oil resistant condensation curing silicone compositions which are suitable for sealing and gasketing applications. Methods of making and using such condensation curing silicone compositions are also provided.

2. Brief Description of Related Technology

Conventional room temperature vulcanizable ("RTV") silicone compositions have excellent sealing and adhesive properties. Such compositions can be formed into gaskets which are used extensively in the automotive industry. For example, several patents assigned to Loctite Corporation and set forth in more detail below, disclose various oil resistant silicone sealant compositions.

In particular, U.S. Pat. No. 4,514,529 (Beers) generally discloses a low modulus, high elongation RTV silicone composition having oil resistance. This composition may include a devolatilized silanol-terminated diorganosiloxane of 2,000 to 250,000 Cst, a devolatilized diorganosiloxane fluid plasticizer terminated with triorganosiloxy groups, a cross-linking agent, a catalyst and a filler. Articles formed from such a composition can be used as, e.g., gasket sealants, as well as formed-in-place gaskets for use on internal combustion engines.

U.S. Pat. No. 4,673,750 (Beers), U.S. Pat. No. 4,735,979 (Beers) and U.S. Pat. No. 4,847,396 (Beers) generally disclose adhesion promoter compositions for use in autoadhering, one-component RTV silicone sealant systems having oil resistance. The adhesion promoters set forth in these patents include glycidoxyalkyl substituted mixed alkoxyoxime silanes and di-substituted mixed oxime-alkoxysilylalkyl ureas, respectively. The RTV silicone compositions which contain these oxime adhesion promoters generally include polydimethylsiloxanes, trimethylsilyl terminated polydimethylsiloxanes and various other fillers, additives and catalysts. Such compositions may be used to, e.g., make formed-in-place gasket materials.

International PCT Publication No. WO 93/19130 discloses a one-part RTV silicone rubber composition as a formed-in-place gasket having oil resistant properties. Such a composition includes a diorganopolysiloxane, a M-stopped plasticizer, such as for example, $R_3$—Si—$(OSiR_2)_x$—OSi—$R_3$, gamma-aminopropyltriethoxysilane, a catalyst, a crosslinker and various fillers. M-stopped silicone plasticizers are generally trimethyl terminated non-reactive silicone compositions. The compositions disclosed by this International patent publication are reported to have oil resistance and good adhesive properties and are especially adapted for use in the automobile industry.

As might be expected for gasketing articles and adhesives used in the automobile industry, such as engine seals and gaskets, retention of adhesion and maximization of joint movement after oil immersion at elevated temperatures is highly desirable. Silicone plasticizers are conventionally used to modify silicone gasketing compounds, such as for example, to lower the modulus of the composition and improve joint movement and the extrudability of the finished product. All of the RTV silicone adhesive compositions set forth above contain M-stopped silicone plasticizers for accomplishing such goals.

It would be desirable to provide such silicone adhesive compositions without using M-stopped plasticizers

SUMMARY OF THE INVENTION

The present invention provides a silicone composition, which includes a silanol terminated silicone fluid, an organic plasticizer, a filler and a crosslinker. The reaction product of this composition forms an oil resistant adhesive silicone composition.

The invention also provides a method of applying a silicone composition to a surface exposed to oil during its intended use. This method includes applying to the exposed surface a composition that includes a condensation curing silanol terminated silicone polymer, an organic plasticizer, a filler and a crosslinker. The method further includes forming the composition into an appropriate sealing configuration and allowing the composition to cure at room temperature into an oil resistant silicone adhesive.

Also, the invention provides a method of using an oil resistant mechanical seal, which remains adhesive after exposure to oil. This method includes applying a seal forming amount of a composition on a surface of a mechanical part. The composition is formed from a condensation curing silanol terminated silicone polymer, an organic plasticizer, a filler and a crosslinker. The method further includes forming a seal between at least two mechanical surfaces by room temperature vulcanization, wherein the seal remains competent when exposed to oil.

Still further, the invention provides a method of using an oil resistant sealing member that remains adhesive after immersion in oil. This method includes forming a seal between two or more surfaces by applying therebetween the oil resistant sealing member formed from a composition that includes a condensation curing silanol terminated silicone polymer, an organic plasticizer, a filler and a catalyst.

It has been found surprisingly that by substituting such M-stopped silicone plasticizers with organic plasticizers in these RTV silicone systems that compositions are formed with significantly improved adhesive properties and resistance to oil.

The present invention will be more fully understood by a reading of the section entitled "Detailed Description of the Invention".

DETAILED DESCRIPTION OF THE INVENTION

The present invention is directed to condensation curing silicones having improved adhesive properties when exposed to oil. Conventional RTV silicones having M-stopped silicone plasticizers, however, are less desirable for adhesives and articles that are exposed to high temperature oils, such as for example, engine O-rings and gaskets typically used in the automotive industry. Surprisingly, as noted above, it has been found that by substituting an organic plasticizer for the M-stopped silicone plasticizer in such RTV silicone compositions that improved adhesive and oil resistance is obtained.

The present invention provides a silicone composition that includes a silanol-terminated silicone fluid, an organic plasticizer for maintaining adhesion of the composition after exposure and/or immersion in oil, a filler and a crosslinker. The reaction product of this composition is an oil resistant adhesive.

As used herein, "silanol terminated silicone fluid" includes room temperature condensation curing silicone polymers. Such polymers are conventional silicone polymers that are able to cure/vulcanize using moisture from the air at ambient temperature (approximately 25° C.). Higher curing temperatures, however, can also be used, such as for example 50° C., so long as the oil resistant and adhesive properties of the cured elastomers are not compromised.

The silicone polymers of the present invention typically contain functional groups capable of reacting with moisture to substantially cure the composition. Typically, such condensation curing silicone polymers include, for example, polydiorganosiloxanes having terminal hydroxyl groups that are curable to an elastomer upon cross linking. Other silicone compositions, however, can be used in the present invention so long as they are capable of condensation curing to form the oil resistant silicone compositions as described in more detail below.

In the present invention, these silicone polymers can have viscosities that range from about 2,000 Cst to about 200,000 Cst. Desirably, these polymers can range in viscosity from about 4,000 Cst to about 50,000 Cst. Viscosity ranges for these polymers of from about 6,000 Cst to about 20,000 Cst can also be used in the present invention.

The adhesive silicone compositions of the present invention also include one or more organic plasticizers. As used herein, "organic plasticizer" refers to carbon atom-containing plasticizers that do not contain silicone atoms. Any conventional organic plasticizer able to form the present fuel resistant silicone compositions can be used in the present invention. For example, suitable organic plasticizers that can be used in conjunction with the present invention include aliphatic liquid polymers and oils. Other organic plasticizers that can be used in the present invention include, for example, petroleum derived organic oils. Moreover, other suitable organic plasticizers include, for example, alkyl phosphates, polyalkylene glycol, poly(propylene oxides), hydroxyethylated alkyl phenol, dialkyldithiophosphonate, poly(isobutylenes), poly(α-olefins) and mixtures thereof. Desirably, the plasticizer is a liquid polyisobutylene or other similar composition.

In the present compositions, effective amounts of organic plasticizers are added to ensure the desired workability and oil resistance of the final elastomer. Accordingly, from about 1% to about 50% by weight of a selected organic plasticizer can be incorporated into the compositions of the present invention. Desirably, from about 10% to about 36% by weight of a selected organic plasticizer, such as about 14% to about 25%, can be incorporated into the compositions of the present invention.

As shown in the examples below, the use of organic plasticizers in place of M-stopped silicone plasticizers significantly increases the shear adhesion and joint movement of the compositions of the present invention because the organic plasticizers do not significantly equilibrate into the cured polymer matrix. Thus, the present compositions have significantly improved adhesion and oil resistant properties compared to conventional RTV silicone compositions having M-stopped silicone plasticizers.

The silicone compositions of the present invention also contain fillers depending upon the desired properties and functions of the final cured elastomer. These fillers include, for example, titanium dioxide, lithopone, zinc oxides, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crush cores, calcium clay, carbon, graphite, cork, cotton, synthetic fibers and mixtures thereof. Other conventional fillers can also be incorporated into the present compositions provided they do not adversely effect the oil resistant and adhesive properties of the final end product produced therefrom.

The silicone compositions of the present invention also include one or more crosslinkers. In the present invention, the crosslinker includes, for example, methyltrimethoxysilane, vinyltrimethoxysilane, methyltriethoxysilane, vinyltriethoxysilane, methyltriacetoxysilane, vinyltriethoxysilane, methyltriacetoxysilane, methyl tris-(N-methylbenzamido) silane, methyl tris-(isopropenoxy)silane, methyl tris (cyclohexylamino)silane, methyl tris-(methyl ethyl ketoximino)silane, vinyl tris-(methyl ethyl ketoximino) silane, methyl tris-(methyl isobutyl ketoximino)silane, vinyl tris-(methyl isobutyl ketoximino)silane, tetrakis-(methyl ethyl ketoximino)silane, tetrakis-(methyl isobutyl ketoximino)silane, tetrakis-(methyl amyl ketoximino)silane, dimethyl bis-(methyl ethylketoximino) silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silanes, tetrafunctional alkoxy-ketoximino silanes and enoxysilanes. Other conventionally known crosslinkers can also be used with the present compositions, provided they are able to crosslink the present compositions without adversely affecting the adhesive and oil resistant properties of the final elastomeric articles formed therefrom.

The present silicone compositions can also include optional catalysts for increasing the cure rate thereof. Any conventional catalyst system may be employed with the present compositions provided the excellent adhesive and oil resistant properties of the final elastomeric articles are not compromised. Suitable catalysts that can be used with the present compositions, include for example, dibutyltin dilaurate, dibutyltin diacetate, dibutyltin dioctoate, dibutyltin maleate, dialkyl tin hexoate, dioctyltin dilaurate, iron octanoate, zinc octanoate, lead octanoate, cobalt naphthenate, tetrapropyltitanate, tetrabutyltitanate, tin dimethyl bis neodecanoate, dialkyl tin carboxylates, mercaptans and titanates.

Other additional additives can also be incorporated into the present compositions, provided they do not adversely effect the ability of these compositions to resist certain organic solvents, such as oil, and to maintain their excellent adhesive properties. For example, an adhesion promoter can be added to the present compositions. Such an adhesion promoter can include, for example, gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, 3-glycidoxypropyltrimethoxy silane, gamma-mercaptopropyltrimethoxysilane and gamma-methacryloxypropyltrimethoxysilane.

Conventional pigments, such as for example, titanium dioxide pigment, can also be incorporated into the present invention provided they do not adversely effect the oil resistant and adhesive properties of the final end product produced therefrom.

The reaction products of present compositions are useful as adhesives for bonding together surfaces that are exposed to oil during their intended use. Thus, the present adhesive compositions can be used on oil exposed surfaces in, for example, conventional 2 cycle engines. The compositions of the present invention may also be formed into many different configurations and then condensation cured over time under ambient or elevated temperature conditions. Articles formed in such a manner are useful in various industries where there is a need for oil and/or fuel resistant silicone-based elastomeric articles. In the automotive industry, for example, O-rings, hoses, seals, and gaskets can be formed from the present compositions. Other conventional uses requiring good adhesive properties, as well as fuel and/or oil resistance are also contemplated for the present compositions.

In another embodiment of the present invention, there is provided a method of applying a silicone composition to a surface exposed to oil during its intended use. The surface to which the present compositions are applied can be any work surface that is exposed to oil and/or fuel, such as certain work surfaces of conventional internal combustion engines. This method includes applying a composition of the present invention to the work surface.

Briefly, this composition includes a condensation curing silanol terminated silicone polymer, an effective amount of an organic plasticizer to maintain adhesion of the composition after immersion in oil, a filler and a crosslinker. The composition is subsequently formed into an appropriate sealing configuration and then allowed to cure at room temperature to form an oil resistant silicone adhesive.

In yet another embodiment of the present invention, there is provided a method of using an oil resistant mechanical seal which remains adhesive after exposure to oil. This method includes applying a seal forming amount of the composition as described previously onto a surface of a mechanical part. This composition is formed from a condensation curing silanol terminated silicone polymer, an effective amount of an organic plasticizer to maintain adhesion of the composition after immersion in oil, a filler and a crosslinker. A seal is then formed between at least two mechanical surfaces by, for example, room temperature vulcanization, wherein the seal remains competent when exposed to oil.

In still yet another embodiment of the present invention, there is provided a method of using an oil resistant sealing member that remains adhesive after contact with and/or immersion in oil. This method includes forming a seal between two or more surfaces by applying therebetween the oil resistant sealing member formed from a composition according to the present invention.

In each of the methods set forth above, the compositions may be formed into any conventional article useful for creating seals around or between work surfaces, such as for example, O-rings and gaskets.

The following examples are provided to further illustrate methods of preparation of the silicone compositions, and used elastomers thereof, as well as certain physical properties of these materials, These examples are illustrative only and are not intended to limit the scope of the invention in any way.

EXAMPLES

In these examples, uncured oil resistance silicone adhesive compositions were prepared, certain of which are within the scope of the present invention and others of which include an M-stopped silicone plastisizer for comparative properties.

TABLE 1

Formulations of Uncured Oil Resistant Silicone Adhesive Compositions

| Description* | Composition (wt. %) | | | | | |
| --- | --- | --- | --- | --- | --- | --- |
| | 1 | 2 | 3 | 4 | 5 | 6 |
| 1 6000 Cst Silanol Fluid | 52.4 | 46.4 | 46.4 | 52.4 | 43.4 | 43.4 |
| 2 Fumed Silica (AEROSIL R974) | 8 | 4 | 4 | 8 | 10 | 10 |
| 3 ppt. CaCO$_3$ (SOCAL 322) | 10 | 20 | 10 | 10 | 16 | 16 |
| 4 TiO$_2$ Pigment | 1 | 1 | 1 | 1 | 1 | 1 |
| 5 Organic Plasticizer (INDOPOL L-14) | 24 | 24 | 24 | — | 25 | — |
| 6 100 Cst Silicone Plasticizer | — | — | — | 24 | — | 25 |
| 7 Vinyl trioximino-silane ("VOS") | 4 | 4 | 4 | 4 | 4 | 4 |
| 8 Aminosilane | 0.5 | 0.5 | 0.5 | 0.5 | 0.5 | 0.5 |
| 9 UL-28 Catalyst | 0.1 | 0.1 | 0.1 | 0.1 | 0.1 | 0.1 |
| 10 Omya FT (ground CaCO$_3$) | — | — | 10 | — | — | — |

*Certain of the above referenced reagents were obtained commercially from the following suppliers:

| Tradename | Supplier | Description |
| --- | --- | --- |
| Socal 322 | Solvay | precipitated CaCO$_3$ |
| Silanol Fluid | Dow Corning; GE; Bayer | silanol terminated polydimethylsiloxane |
| Aerosil R974 | Cabot | surface treated fumed silica |
| TiO$_2$ | Dupont | titanium dioxide pigment |
| Fomrez UL-28 Catalyst | Witco | aminopropyltrimethoxysilane adhesion promoter |
| Aminosilane | Sivento; Dow Corning | aminopropyltrimethoxysilane adhesion promoter |
| SiliconePlast. | Dow Corning; GE; Bayer | trimethylsilyl terminated polydimethylsiloxane |
| Indopol L-14 | Amoco | polyisobutylene (polybutene) |

Example 1

Compositions 1 and 4 set forth in Table 1 supra were prepared by combining items 1–4 with slow mixing for approximately 5 minutes. Once the powders were incorporated, the speed of the mixing was increased and a vacuum was applied. Mixing was continued under vacuum for approximately 3 hours at 100° C. The respective compositions were then allowed to cool to room temperature (approximately 25° C.). Once at room temperature, item 5 (Comp. 1) or item 6 (Comp. 4) and item 7 were added to the respective compositions and slowly mixed under vacuum until the powers were incorporated. The mixing speed was then increased. Items 8 and 9 were then mixed into the respective compositions for 20 minutes under vacuum. The uncured products were then collected under a nitrogen blanket. Composition 1 was made according to the present invention with an organic plasticizer. Composition 4 was made using an M-stopped silicone plasticizer,

Example 2

Compositions 2 and 3 set forth in Table 1 supra were prepared by combining items 1–4 (Comp. 3) and items 1–4 and 10 (Comp. 4) with slow mixing for approximately 5 minutes. Once the powders were incorporated, the speed of the mixing was increased and a vacuum was applied. Mixing was continued under vacuum for approximately 3 hours at 100° C. The respective compositions were then allowed to cool to room temperature (approximately 25° C.). Once at room temperature, items 5 and 7 were added to the respective compositions and slowly mixed under vacuum until the powers were incorporated. The mixing speed was then increased. Items 8 and 9 were then mixed in into the respective compositions for 20 minutes under vacuum. The uncured products were then collected under a nitrogen blanket. Compositions 3 and 4 represent different embodiments of the present invention having organic plasticizers incorporated therein.

Example 3

Compositions 5 and 6 set forth in Table 1 supra were prepared by combining items 1–4 with slow mixing for approximately 5 minutes. Once the powders were incorporated, the speed of the mixing was increased and a vacuum was applied. Mixing was continued under vacuum for approximately 3 hours at 100° C. The respective compositions were then allowed to cool to room temperature (approximately 25° C.). Once at room temperature, item 5 (Comp. 5) or item 6 (Comp. 6) and item 7 were added to the respective compositions and slowly mixed under vacuum until the powers were incorporated. The mixing speed was then increased. Items 8 and 9 were then mixed in into the respective compositions for 20 minutes under vacuum. The uncured products were then collected under a nitrogen blanket. Composition 5 was made according to the present invention with an organic plasticizer. Composition 6 was made using an M-stopped silicone plasticizer.

Example 4

Certain physical properties of compositions 1–6 from Table 1 supra were evaluated and are set forth in Table 2 infra. Three sets of conventional lap shear specimens were prepared from compositions 1–6, respectively and were allowed to cure for 7 days in approximately 50% relative humidity at approximately 50° C. The data in Table 2 represents the average values derived from each experiment run in triplicate.

The "Control" columns represent the cured elastomers of inventive compositions 1–6 without exposure to oil. The "Oil" columns represent the cured elastomers of inventive compositions 1–6 when immersed in oil for 3 days at 120° C.

TABLE 2*

Oil and Fuel Resistant Properties of Compositions 1–6

| Composition | Joint Movement (inches) | | Shear Strength (psi) | | Cohesive Failure (%) | |
| --- | --- | --- | --- | --- | --- | --- |
| | Control | Oil | Control | Oil | Control | Oil |
| 1 | 0.142 | 0.218 | 121.6 | 211.4 | 10 | 100 |
| 2 | 0.124 | 0.211 | 84.3 | 190.3 | 20 | 100 |
| 3 | 0.129 | 0.228 | 86.3 | 160.8 | 30 | 90 |
| 4 | 0.186 | 0.204 | 204.15 | 86.4 | 80 | 65 |
| 5 | 0.116 | 0.131 | 148.28 | 174.16 | 3.3 | 3.3 |
| 6 | 0.176 | 0.151 | 194.03 | 64.6 | 0 | 0 |

*All of the data set forth in Table 2 represent the average value obtained in each of three tests, i.e., a Joint Movement test which is a measure of the linear displacement at break of conventional lap shear specimens; a Shear Strength test which is a measure of the force necessary to break the joint of the lap shear specimen; and a Cohesive Failure test which is a visual estimate of the failure within the adhesive as measured by the amount of the cured elastomer remaining on each of the test surfaces.

As the data indicate, the inventive compositions (Compositions 1, 2, 3 and 5)—those condensation curing silicone adhesive compositions having organic plasticizers instead of M-stopped silicone plasticizers—are significantly more adhesive after immersion in oil at elevated temperatures compared to compositions 4 and 6 which contain a conventional silicone plasticizer.

The invention being thus described, it will be obvious that the same may be varied in many ways. Such variations are not to be regarded as a departure from the spirit and scope of the invention and all such modifications are intended to be included within the scope of the following claims.

What is claimed is:

1. A silicone composition comprising:
   a. a silanol terminated silicone fluid;
   b. an organic plasticizer;
   c. a filler; and
   d. a crosslinker, wherein a reaction product of said composition maintains adhesion to metal substrates after exposure to oil at temperatures of about 120° C. for at least three days, provided that said composition does not contain a trimethyl-terminated, non-reactive silicone plasticizer.

2. The silicone composition according to claim 1, further comprising a catalyst.

3. The silicone composition according to claim 2, wherein said catalyst is selected from the group consisting of dibutyltin dilaurate, dibutyltin diacetate, dibutyltin dioctoate, dibutyltin maleate, dialkyl tin hexoate, dioctyltin dilaurate, iron octanoate, zinc octanoate, lead octanoate, cobalt naphthenate, tetrapropyltitanate, tetrabutyltitanate, tin dimethyl bis neodecanoate, dialkyl tin carboxylates, mercaptans and titanates.

4. The silicone composition according to claim 1, wherein said crosslinker is selected from the group consisting of methyltrimethoxysilane, vinyltrimethoxysilane, methyltriethoxysilane, vinyltriethoxysilane, methyltriacetoxysilane, vinyltriethoxysilane, methyltriacetoxysilane, methyl tris-(N-methylbenzamido) silane, methyl tris-(isopropenoxy)silane, methyl tris (cyclohexylamino)silane, methyl tris-(methyl ethyl ketoximino)silane, vinyl tris-(methyl ethyl ketoximino) silane, methyl tris-(methyl isobutyl ketoximino)silane, vinyl tris-(methyl isobutyl ketoximino)silane, tetrakis-(methyl ethyl ketoximino)silane, tetrakis-(methyl isobutyl ketoximino)silane, tetrakis-(methyl amyl ketoximino)silane , dimethyl bis-(methyl ethylketoximino)silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silanes, tetrafunctional alkoxy-ketoximino silanes and enoxysilanes.

5. The silicone composition according to claim 1, wherein said silanol terminated silicone fluid is a polydiorganosiloxane having terminal hydroxyl groups in an amount sufficient to form said silicone composition which is curable to an elastomer upon crosslinking.

6. The silicone composition according to claim 1, wherein said silicone fluid has a viscosity of from about 2,000 Cst to about 200,000 Cst.

7. The silicone composition according to claim 1, wherein said organic plasticizer is present in an amount of from about 1% to about 50% by weight.

8. The silicone composition according to claim 1, wherein said organic plasticizer is present in an amount of from about 10% to about 36% by weight.

9. The silicone composition according to claim 1, wherein said organic plasticizer is present in at a concentration from about 14% to about 25% by weight.

10. The silicone composition according to claim 1, wherein said filler is selected from the group consisting of titanium dioxide, lithopone, zinc oxides, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crush cores, calcium clay, carbon, graphite, cork, cotton, synthetic fibers and mixtures thereof.

11. The silicone composition according to claim 1, further comprising an adhesion promoter.

12. The silicone composition according to claim 11, wherein said adhesion promoter is selected from the group consisting of gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, 3-glycidoxypropyltrimethoxy silane, gamma-mercaptopropyltrimethoxysilane and gamma-methacryloxypropyltrimethoxysilane.

13. The silicone composition according to claim 1, further comprising a pigment.

14. The silicone composition according to claim 1, wherein said organic plasticizer comprises aliphatic liquid polymers and oils.

15. The silicone composition according to claim 1, wherein said organic plasticizer is a petroleum derived organic oil.

16. The silicone composition according to claim 1, wherein said organic plasticizer is selected from the group consisting of alkyl phosphates, polyalkylene glycol, poly(propylene oxides), hydroxyethylated alkyl phenol, dialkyldithiophosphonate, poly(isobutylenes), poly($\alpha$-olefins) and mixtures thereof.

17. The silicone composition according to claim 1, wherein said organic plasticizer is a liquid polyisobutylene.

18. The silicone composition according to claim 1, wherein said composition is formed into an oil resistant gasket or O-ring.

19. An oil resistant cured elastomer formed from the reaction product of said silicone composition of claim 1.

20. A method of providing an adhesive silicone composition to a surface exposed to oil comprising:
   a. applying to said surface a composition comprising:
      i. a condensation curing silanol,
      ii. an organic plasticizer,
      iii. a filler, and
      iv. a crosslinker, provided that said composition does not contain a trimethyl-terminated, non-reactive silicone plasticizer;
   b. forming said composition into an appropriate sealing composition into an appropriate sealing configuration; and
   c. allowing said composition to cure at room temperature wherein said cured composition remains adhesive to metal substrates after exposure to oil at temperatures of about 120° C. for at least three days.

21. The method according to claim 20, wherein said organic plasticizer is present in an amount of about 1% to about 50% by weight.

22. The method according to claim 20, wherein said forming step further includes forming said composition into an O-ring or a gasket.

23. A method of using an oil resistant mechanical seal which remains adhesive after exposure to oil, comprising the steps of:
   a. applying a seal forming amount of a composition on a surface of a mechanical part wherein said composition is formed from a condensation curing silanol terminated silicone polymer, an effective amount of an organic plasticizer to maintain adhesion of said composition after immersion in oil, a filler and a crosslinker, provided that said composition does not contain a trimethyl-terminated, non-reactive silicone plasticizer; and
   b. forming a seal between at least two mechanical metal surfaces by room temperature vulcanization, wherein said seal remains competent when exposed to oil at temperatures of about 120° C. for at least three days.

24. The method according to claim 23, wherein said organic plasticizer is present in an amount of about 1% to about 50% by weight.

25. The method according to claim 23, wherein said forming step further includes forming said composition into an O-ring or a gasket.

26. A method of using an oil resistant sealing member that remains adhesive after immersion in oil comprising forming a seal between two or more surfaces by applying therebetween said oil resistant sealing member formed from a composition comprising a condensation curing silanol terminated silicone polymer, an effective amount of an organic plasticizer to improve adhesion of said composition to metal substrates after immersion in oil at temperatures of about 120° C. for at least three days, a filler and a catalyst, provided that said composition does not contain a trimethyl-terminated, non-reactive silicone plasticizer.

27. The method according to claim 26, wherein said organic plasticizer is present in about 1% to about 50% by weight.

28. The method according to claim 26, wherein said sealing member is an O-ring or a gasket.

29. A silicone composition consisting essentially of:
   a. a silanol terminated silicone fluid;
   b. an organic plasticizer;
   c. a filler; and
   d. a crosslinker, wherein a reaction product of said composition maintains adhesion to metal substrates after exposure to oil.

* * * * *